W. F. CLARK.
HEATING APPARATUS.
APPLICATION FILED APR. 24, 1919.
1,381,282.
Patented June 14, 1921.
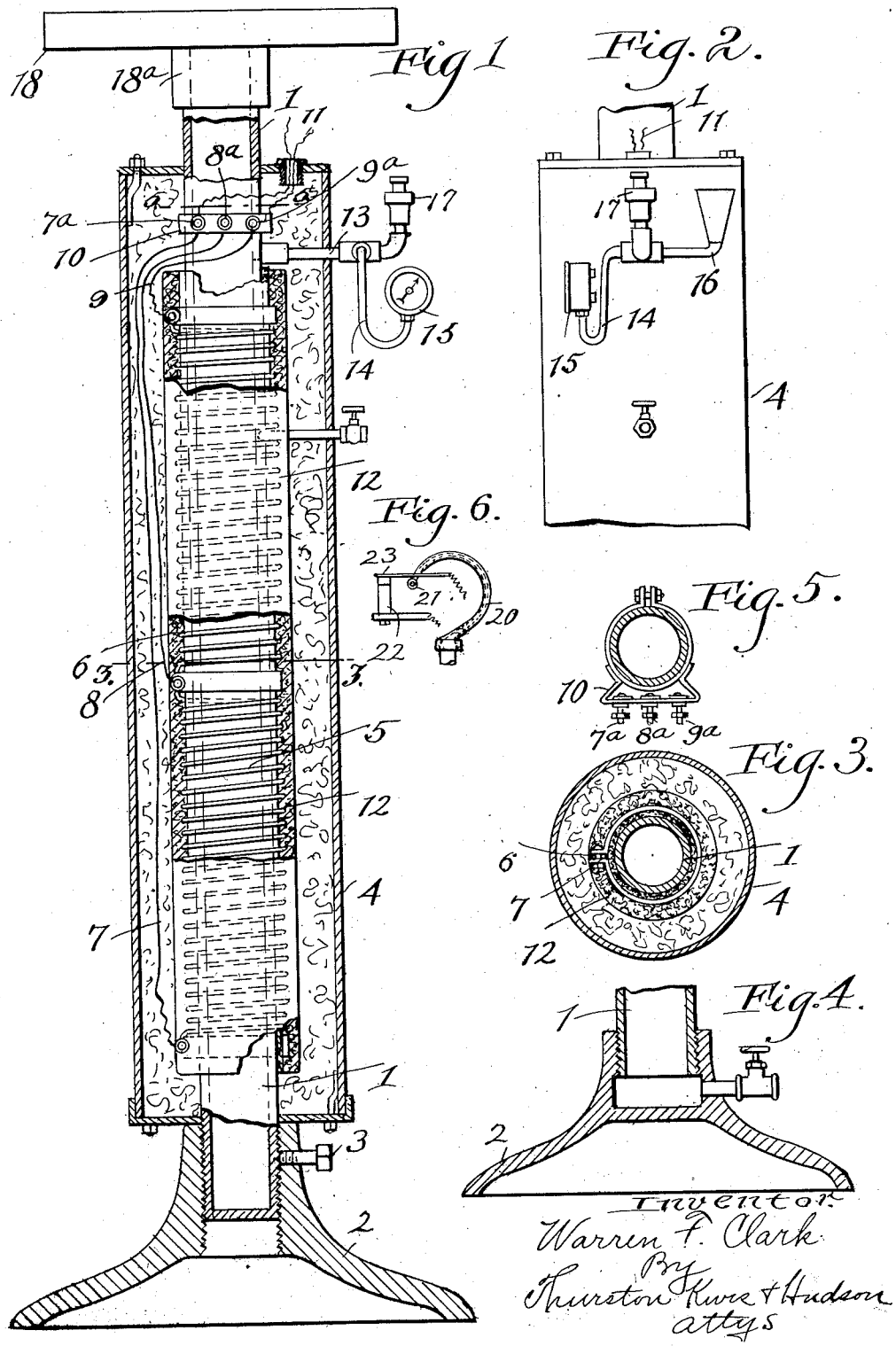

UNITED STATES PATENT OFFICE.

WARREN F. CLARK, OF CLEVELAND, OHIO, ASSIGNOR TO THE STEAM-ELECTRIC PRODUCTS COMPANY, A CORPORATION OF OHIO.

HEATING APPARATUS.

1,381,282. Specification of Letters Patent. Patented June 14, 1921.

Application filed April 24, 1919. Serial No. 292,519.

*To all whom it may concern:*

Be it known that I, WARREN F. CLARK, a citizen of the United States, residing at Cleveland, in the county of Cuyahoga and State of Ohio, have invented a certain new and useful Improvement in Heating Apparatus, of which the following is a full, clear, and exact description.

This invention relates to a device which is particularly adapted for efficiently heating water or similar fluid, and further for heating the water for the production of steam.

The object of the invention is to produce a device which is compact, one in which the application of heat is effected by electricity, and the heat applied to the container in a manner to provide a high efficiency with regard to the heating effect produced relative to the current consumed.

A further object is to provide a device which is so constructed as to render the application of heat quickly responded to by the water, so that intermittent applications of heat will serve to maintain the temperature of the water at the desired point.

A further object is to provide a construction which may serve as a steam generator, with provision for super heating the steam produced.

A further object is to apply the heating element to the water container so as to permit a variation in the application of heat.

A further object is to provide a device of the character described in which the electric heating coil is so applied to the water container as to produce electric inductive effects in the body of the water container.

Generally speaking the invention may be said to comprise the elements and the combinations thereof set forth in the accompanying claims.

Reference should be had to the accompanying drawings, forming a part of this specification, in which Figure 1 is a vertical section through the device; Fig. 2 is a side elevation of a portion of the device; Fig. 3 is a transverse section on the line 3—3 of Fig. 1; Fig. 4 is a sectional elevation through a modified form for the lower portion of the device; Fig. 5 is a section on the line 5—5 showing a detail of construction; Fig. 6 is an elevation showing the elements of the pressure responsive device.

Referring to the drawings: 1 designates a hollow container which is preferably a pipe section with the lower end thereof closed and the upper end thereof open. The container 1 is mounted upon a suitable base or support such as is indicated at 2. The base as here shown being provided with a central opening, adapted to receive the lower end of container 1, which is retained in the opening in any suitable manner which as here shown comprises, threading the opening in base 2, threading a portion of the exterior wall of container 1 and screwing the lower end of container 1 into the base 2. A set screw 3 may be employed to retain the container in position with respect to the base.

Surrounding the container is a casing 4, which casing may conveniently be supported upon the base. Upon a portion of the container 1, there is wound a coil of electrical resistance wire and this coil is preferably, although not necessarily formed in two parts indicated at 5 and 6 respectively. Lead wires 7, 8 and 9 extend respectively from the lower end of coil 5, the joining point of coils 5 and 6 and the upper end of coil 6, respectively to binding posts 7ª, 8ª and 9ª, which binding posts are carried by a support 10, which is supported upon container 1 as shown in Fig. 5.

There are wires generally indicated at 11, which extend from the binding posts just described, through a suitable opening in casing 4. The coils 5 and 6 are wound directly upon the container 1 and there is applied to the coils a covering of heat insulating material indicated at 12. This material embeds the wires in the same, so that the maximum heating effect derived from the passage of electric current through the coils is applied to the container 1.

Usually the container 1 is made of iron or other material, which is a conductor of electricity; hence when the coils 5 and 6 or either of them is energized by an alternating current or even by the usual commercially supplied direct current which is slightly pulsating in character, the rising and falling flux produced induces a current in the wall of the container, which manifests a heating effect, so that the resultant effect is to produce an intimate and efficient application of heat to the contents of the container.

The design and construction of the container 1 is to provide a relatively small cross section and secure the capacity desired by selecting a container of proper length. Obviously, if the cross section is small the response to the heating action is quick, which makes the device sensitive. It is further obvious that no matter what the length of container 1 may be, the heating coil or coils may be applied throughout whatever portion of the length may be desirable to produce the required effects.

By providing the electrical heating element, in the form of a plurality of coils, it is possible to energize one or more of the coils in order to produce the amount of heating action desired. For instance, if it be desired to substantially maintain a certain temperature condition of the water in the container, it is possible at intervals to cut into the energizing electric circuit one or more coils as may be required for the purpose.

This may be accomplished by suitable switch mechanism which is controlled by pressure conditions within the container and at 13 there is indicated a pipe which communicates with the interior of container 1, which pipe in turn by a pipe 14 communicates with a pressure responsive device 15 by which the supply of electric current to the coils 5 and 6 is controlled. The container is supplied with water through a valve controlled connection 16 which communicates with the pipe 13.

Connecting with the pipe 13 is a part 17, a safety relief construction of any desired sort, which will operate to relieve the pressure when the same exceeds a predetermined amount.

The upper end of the container 1 is open and adapted for connection to any apparatus or device with which the generator is to be associated.

In the present instance the container 1 is connected with a top 18. This top member is provided with a neck 18ª which is interiorly threaded, while the exterior of the same is threaded to coöperate with the neck 18ª. The top member 18 is hollow and specifically is intended to form a hollow hot plate, which is maintained in its hot condition by steam generated in the container 1, and passing to the member 18.

The particular member 18 which is here shown is but one form of coöperating device which may be used with the device forming this invention and in this connection we wish to particularly call attention to the fact that this device is a unit which is applicable to very many uses, where steam is required to maintain a coöperating device at a substantially uniform temperature condition.

The operation of the device may be described as follows: The container 1 is filled a little more than half full of water through the filling spout 16. Electric current is then supplied to the coils 5 and 6 and the water which is within the container is quickly heated to the temperature at which steam is formed. The steam as it rises from the water carries considerable vapor, but as this steam and vapor pass through the upper portion of the container 1 and above the water level, they pass through a portion of the container which acts as a superheater so that as the steam passes from the container into the device with which the container is associated the steam is in a superheated condition.

As before explained, there is a pressure responsive device 15 which is associated with the container, which pressure responsive device controls the supply of current to the coils 5 and 6. This pressure device may of course be adjusted so that it becomes responsive at a pressure determined by the temperature condition which it is desired to maintain.

The pressure responsive device may be such a one as shown and described in my application filed May 3, 1919, Sr. No. 294411. Briefly described the device comprises a Bourdon tube 20 which is in communication with pipe 14 so that it will be more in accordance with pressure conditions to which it is subjected. The tube is provided with an extension 21, which is in position to coöperate with one or both of a pair of contacts 22 and 23, which contacts are in electrical connection with the heating coil, the operation being, that the movement of the tube will under certain conditions move the contacts apart and under other conditions permit the contacts to remain together and thus preserve the circuit through the heating coil. The contacts are thus moved in accordance with the pressure conditions within the container.

It will therefore be apparent that when the coils are functioning, the water will be heated and steam generated until the pressure within the container causes the pressure responsive device to function, at which time the current is shut off from the coils 5 and 6. When the pressure conditions within the generator fall below the set pressure for which the pressure responsive device is adjusted, electric current is again supplied to the coils and the operation repeated.

The particular arrangement of having the water section of small cross sectional area as compared with the length, is particularly efficient in a device of the character because the device become quickly responsive when heat is applied, thereby greatly assisting in maintaining a constant temperature in the device which is being supplied with steam. In fact the ability of this device to maintain this substantially constant temperature is one of its chief characteristics.

I claim—

1. A device of the character described comprising a hollow cylindrical container, the cross-sectional area of which is small compared with its length, one end of such container being open and a coil of electric resistance wire wound upon the outside of such container and in contact therewith a pipe connecting with such container and a pressure responsive controlling device associated with such pipe.

2. In a device of the character described a cylindrical container open at one end and a two-part coil of electric resistance wire surrounding said container through a portion of its length, lead wires extending from the opposite ends of the said coils and from the adjacent ends of said coils and means embedding the wires of the coils.

3. In a device of the character described a hollow tubular member which is open at one end, said tubular member having a portion adapted to serve as a water container and a portion as a superheating chamber, a coil of electric resistance wire associated with both portions of the tubular member, heat insulating material surrounding the tubular member and embedding the coil and a protecting casing surrounding the tubular member, the coil and the insulated material.

4. In a device of the character described the combination with a hollow container, the cross-sectional area of which is small compared with its length, of a closed hollow member which communicates with the said container, a coil of electric resistance wire wound around the exterior of said container through a portion of its length, a pressure responsive device controlling the supply of current to the said coil.

5. In apparatus of the character described, the combination of a container a coil of electric current conducting wire wound upon the container a pressure responsive device in communication with the interior of the container, contacts controlled by said device, said contacts being connected with said coil.

In testimony whereof, I hereunto affix my signature.

WARREN F. CLARK.